(12) United States Patent
Jang et al.

(10) Patent No.: US 10,354,526 B2
(45) Date of Patent: Jul. 16, 2019

(54) DETERMINING LANE SPECIFIC SPEED INFORMATION

(71) Applicant: HERE Global B.V., Eindhoven (NL)

(72) Inventors: Dongwook Jang, Lisle, IL (US); Anton Anastassov, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/366,254

(22) Filed: Dec. 1, 2016

(65) Prior Publication Data

US 2018/0158332 A1    Jun. 7, 2018

(51) Int. Cl.
| | | |
|---|---|---|
| *G01C 21/26* | (2006.01) | |
| *G01C 21/34* | (2006.01) | |
| *G08G 1/16* | (2006.01) | |
| *B60W 40/00* | (2006.01) | |
| *G08G 1/0967* | (2006.01) | |
| *G08G 1/01* | (2006.01) | |
| *G08G 1/052* | (2006.01) | |

(52) U.S. Cl.
CPC ....... *G08G 1/096775* (2013.01); *G01C 21/26* (2013.01); *G08G 1/0112* (2013.01); *G08G 1/0129* (2013.01); *G08G 1/0133* (2013.01); *G08G 1/0141* (2013.01); *G08G 1/052* (2013.01); *G08G 1/096716* (2013.01); *G08G 1/096741* (2013.01)

(58) Field of Classification Search
CPC .. G08G 1/00; G08G 1/13; G08G 1/16; G08G 1/096775; G01C 21/00; G01C 21/26; G01C 21/32; G01C 21/34; B60W 40/00
See application file for complete search history.

(56) References Cited

U.S. PATENT DOCUMENTS

| | | |
|---|---|---|
| 6,385,539 B1 | 5/2002 | Wilson et al. |
| 6,804,580 B1 | 10/2004 | Stoddard et al. |
| 6,850,841 B1 | 2/2005 | Casino |
| 7,418,346 B2 | 8/2008 | Breed |
| 8,005,602 B2 | 8/2011 | Bando et al. |
| 8,352,111 B2 | 1/2013 | Mudalige |
| 8,352,112 B2 | 1/2013 | Mudalige |
| 8,406,939 B2 | 3/2013 | Jackson et al. |
| 8,494,759 B2 | 7/2013 | Hada |

(Continued)

FOREIGN PATENT DOCUMENTS

| | | |
|---|---|---|
| CN | 102540978 A | 7/2012 |
| EP | 2 180 456 A1 | 4/2010 |

(Continued)

OTHER PUBLICATIONS

International Search Report and Written Opinion from International Patent Application No. PCT/EP2017/062633, dated Sep. 13, 2017, 15 pages.

(Continued)

*Primary Examiner* — Yonel Beaulieu
(74) *Attorney, Agent, or Firm* — Alston & Bird LLP (57) ABSTRACT

A method is presented which includes obtaining or holding available map data representing a travel network of road links and determining at least one lane-specific speed profile for a specific lane of at least one selected link of the plurality of links based, at least in part, on perpendicular distances between the selected link as represented by map data and positions represented by a plurality of data points.

20 Claims, 7 Drawing Sheets

(56) References Cited

U.S. PATENT DOCUMENTS

| | | | |
|---|---|---|---|
| 8,615,361 | B2 | 12/2013 | Papajewski et al. |
| 8,676,466 | B2 | 3/2014 | Mudalige |
| 8,937,778 | B1 | 3/2015 | McCarthy |
| 9,053,632 | B2 | 6/2015 | Shen et al. |
| 9,240,123 | B2 | 1/2016 | Stenneth |
| 9,746,331 | B1 | 8/2017 | Yu et al. |
| 9,755,850 | B2* | 9/2017 | Stolfus ............... H04L 12/6418 |
| 9,785,145 | B2 | 10/2017 | Gordon et al. |
| 9,880,019 | B2 | 1/2018 | McCarthy |
| 9,958,283 | B2 | 5/2018 | Anastassov et al. |
| 2004/0172189 | A1 | 9/2004 | Maeda |
| 2006/0095195 | A1 | 5/2006 | Nishimura et al. |
| 2006/0262662 | A1 | 11/2006 | Jung et al. |
| 2007/0192013 | A1 | 8/2007 | Bando et al. |
| 2008/0046165 | A1 | 2/2008 | Downs et al. |
| 2008/0294331 | A1 | 11/2008 | Fushiki et al. |
| 2010/0256835 | A1 | 10/2010 | Mudalige |
| 2011/0121993 | A1 | 5/2011 | Davis et al. |
| 2011/0153166 | A1 | 6/2011 | Yester |
| 2011/0307165 | A1 | 12/2011 | Hiestermann et al. |
| 2012/0059535 | A1 | 3/2012 | Jackson et al. |
| 2012/0059574 | A1 | 3/2012 | Hada |
| 2012/0095682 | A1 | 4/2012 | Wilson |
| 2012/0209505 | A1 | 8/2012 | Breed et al. |
| 2012/0283942 | A1 | 11/2012 | T'Siobbel et al. |
| 2013/0021382 | A1 | 1/2013 | Morlock et al. |
| 2013/0275033 | A1 | 10/2013 | Bastiaensen et al. |
| 2013/0282264 | A1 | 10/2013 | Bastiaensen et al. |
| 2013/0297196 | A1 | 11/2013 | Shida |
| 2013/0311076 | A1 | 11/2013 | Mieth et al. |
| 2014/0149028 | A1 | 5/2014 | Chapman et al. |
| 2014/0278052 | A1 | 9/2014 | Slavin et al. |
| 2014/0288811 | A1 | 9/2014 | Oura |
| 2014/0289267 | A1* | 9/2014 | Felix ..................... G01C 21/32 707/758 |
| 2014/0297182 | A1 | 10/2014 | Casson et al. |
| 2015/0006069 | A1 | 1/2015 | Kwon et al. |
| 2015/0100216 | A1 | 4/2015 | Rayes |
| 2015/0120174 | A1 | 4/2015 | Lewis |
| 2015/0300825 | A1 | 10/2015 | Manoliu et al. |
| 2015/0345971 | A1 | 12/2015 | Meuleau et al. |
| 2016/0223348 | A1* | 8/2016 | Witte ............... G08G 1/096838 |
| 2017/0032667 | A1 | 2/2017 | Fowe et al. |
| 2017/0341660 | A1* | 11/2017 | Jang .................... B60W 40/105 |

FOREIGN PATENT DOCUMENTS

| | | |
|---|---|---|
| WO | 2014/091982 A1 | 6/2014 |
| WO | WO-2015/145637 A1 | 10/2015 |

OTHER PUBLICATIONS

"Acceleration smoothing", Smoothing results—R&D Traffic Technologies Group (TTG)—HERE Confluence Wiki, Retrieved on Sep. 28, 2016, Webpage available at : https://confluence.in.here.com/display/PDOD/Smoothing+results.

"Fit a Smoothing Spline", Statethz.ch/R-manual, Retrieved on Oct. 19, 2016, Webpage available at : https:/stat.ethz.ch/R-manual/R-devel/library/stats/html/smooth.spline.html.

"Friedman's SuperSmoother", Stat.ethz.ch/R-manual, Retrieved on Sep. 27, 2016, Webpage available at : https://stat.ethz.ch/R-manual/R-patched/library/status/html/supsmu.html.

"Local Polynomial Regression Fitting", Stat.ethz.ch/R-manual, Retrieved on Sep. 27, 2016, Webpage available at : https://stat.ethz.ch/R-manual/R-devel/library/stats/html/loess.html.

"Rolling Means/Maximums/Medians/Sums", R project, Retrieved on Sep. 27, 2016, Webpage available at : http://search.r-project.org/library/zoo/html/rollmean.html.

"Scatter Plot Smoothing", Stat.ethz.ch/R-manual, Retrieved on Oct. 19, 2016, Webpage available at : https://stat.ethz.ch/R-manual/R-devel/library/stats/html/lowess.html.

"Smoothing Spline", Wikipedia, Retrieved on Sep. 28, 2016, Webpage available at : https://en.wikipedia.org/wiki/Smoothing_spline.

"The R Project for Statistical Computing", R project, Retrieved on Sep. 27, 2016, Webpage available at : https://www.r-project.org.

Aguilera et al., "A New Kind of Fundamental Diagram with an Application to Road Traffic Emission Modelling", Journal of advanced transportation, vol. 48, 2014, pp. 1-23.

Duran et al., "GPS Data Filtration Method for Drive Cycle Analysis Applications", SAE Technical Paper, Apr. 16, 2012, 6 Pages.

Jun et al., "Smoothing Methods to Minimize Impact of Global Positioning System Random Error on Travel Distance, Speed, and Acceleration Profile Estimates", Journal of the Transportation Research Board, 1972, p. 141-150.

Labakhua et al., "Smooth Trajectory Planning for Fully Automated Passengers Vehicles", In informatics in control, automation and robotics III, 2007, 8 pages.

Office Action for U.S. Appl. No. 15/163,963 dated Aug. 30, 2017.

Ou et. al, A Theoretical Framework for Traffic Speed Estimation by Fusing Low-resolution Probe Vehicle Data, IEEE Transactions on Intelligent Transportation Systems, vol. 12, No. 3, Sep. 2011, pp. 747-756.

Villagra et al., "Smooth Path and Speed Planning for an Automated Public Transport Vehicle", Robotics and Autonomous Systems, vol. 60, No. 2, Feb. 2012, pp. 252-265.

Tong et al., "Traffic Information Deriving Using GPS Probe Vehicle Data Integrated With GIS", Center for Urban and Regional Analysis and Department of Geography, Nov. 17, 2005, 24 pages.

Notice of Allowance for U.S. Appl. No. 15/163,963 dated Feb. 26, 2018.

Notice of Allowance for U.S. Appl. No. 15/163,963 dated Mar. 27, 2018.

Office Action for U.S. Appl. No. 15/164,096 dated May 17, 2018.

Notice of Allowance for U.S. Appl. No. 15/164,172 dated Jul. 11, 2018.

Office Action for U.S. Appl. No. 15/164,058 dated Jul. 13, 2018.

International Preliminary Report on Patentability (Chapter II) for Application No. PCT/EP2017/062633 dated Aug. 20, 2018.

Advisory Action and Interview Summary for U.S. Appl. No. 15/164,096 dated Aug. 28, 2018.

Office Action for U.S. Appl. No. 15/164,058 dated Nov. 6, 2018.

Office Action for U.S. Appl. No. 15/164,096 dated Oct. 5, 2018.

Advisory Action for U.S. Appl. No. 15/164,058 dated Sep. 19, 2018.

Extended European Search Report for European Patent Application No. 17172827.2 dated Oct. 4, 2017, 4 pages.

Office Action for U.S. Appl. No. 15/164,172 dated Dec. 29, 2017, 20 pages.

Office Action for U.S. Appl. No. 15/164,096 dated Jan. 10, 2018, 20 pages.

Office Action for U.S. Appl. No. 15/164,058 dated Jan. 12, 2018, 33 pages.

* cited by examiner

DETERMINING LANE SPECIFIC SPEED INFORMATION

FIELD

The invention relates to the field of determining speed information and more specifically to determining speed information (e.g. one or more speed profiles) for a vehicle (e.g. for autonomous vehicles, highly-assisted-driving vehicles and/or vehicles with predictive cruise control).

BACKGROUND

There have been multiple recent developments in the transportation technology that are revolutionizing the way people experience driving. Such technologies include connected vehicles with mobile access to the internet, adaptive cruise control or autonomous navigation and platooning. Adaptive cruise control systems automatically change the vehicle speed to accommodate curves, traffic congestions or road incidents. Autonomous vehicles take a step farther by taking control not only of the vehicle speed but also of the wheel steering, when turning or changing lanes, with the ultimate goal of taking full control of the whole driving process and thus enabling drivers to become passengers, with all the benefits associated with being relieved from the task of driving. Finally, platooning of multiple trucks would save energy, reduce CO2 emissions and reduce the strain of human drivers. Platooning could open new avenues not only in the trucking industry but also for consumers by releasing the drivers from the task of maneuvering the vehicles. In such platoons the lead vehicle drives either manually or autonomously, followed by vehicles without autonomous driving capacity, in which the drivers become passengers.

SUMMARY OF SOME EMBODIMENTS OF THE INVENTION

In all of the three cases described above, adaptive cruise control, autonomous navigation and platooning, it is conceivable that the vehicles would benefit from using the collective knowledge accumulated from other traffic participants such as human and/or robotic driving experiences. An important quantity that defines the motion of a vehicle is the speed. Traffic participants travel at different speeds on a given link such as a road section. The distribution of these speeds on the link may be characterized by one or more statistical distribution descriptors, including, but not limited to, mean speed, median speed, other speed percentiles, and various measures of the distribution width and shape. The evolution of one or more of these descriptors along a link may be understood to be represented by a speed profile. For example, a median speed profile may represent one or more speeds along the link such that half of the vehicles travel slower, and the other half travel at higher speeds. The speed profiles may be created with high spatial granularity along the link. Such speed profiles can be used by predictive cruise control and autonomous vehicles to provide a human-like driving experience.

According to an exemplary aspect of the invention, a method is presented, which comprises:
 obtaining or holding available map data representing, at least in part, a travel network comprising a plurality of links,
 determining at least one lane specific speed profile for a specific lane of at least one selected link of the plurality of links at least partially based on perpendicular distances between the selected link as represented by the map data and positions represented by a plurality of probe data points.

The presented method may be performed by an apparatus or by a plurality of apparatuses. For example, the presented method may be performed by any one embodiment of the below presented apparatuses. Alternatively or additionally, the presented method may be performed by a plurality of any one embodiment of the below presented apparatuses.

Holding available the map data may be understood to mean that the map data are stored in memory means of an apparatus performing the method. Example of memory means include a volatile memory and a non-volatile memory. Alternatively or additionally, the map data could be obtained by determining the map data or by receiving the map data, for example by a communication interface of an apparatus performing the presented method.

The map data may represent the travel network at least in part by representing a map of at least a part of the travel network.

A link may be a section of the travel network, for example a section between two junctions of the travel network. A link may be a directional link (i.e. only relating to one travel direction on the link) or a non-directional link (relating to more than one travel direction on the link). Each link may be associated with a link identifier (e.g. a unique link identifier). The at least one selected link could be such a link of the travel network, for example an arbitrary link of the travel network which is selected for performing the method.

A lane may be understood to be a part of a link of the travel network that is designated for use by a single line of traffic participants and/or vehicles travelling in the same direction. A link may comprise a plurality of lanes. For example, the selected link may comprise at least two lanes and the specific lane for which the lane specific speed profile is to be determined may be one lane of these at least two lanes of the selected link. The lanes of a link may be numbered. For example, the lanes of a directional link may be numbered from the left to the right in ascending order and by an increment of 1. In this example, the leftmost lane may have the number one and the number of the rightmost lane may correspond to the total number of lanes.

A lane specific speed profile may represent speed information, for example speed information for a vehicle. Examples for speed information are a speed, an acceleration, a deceleration or a combination thereof. A lane specific speed profile may be a speed profile for a specific lane of the selected link representing speed information for all vehicles travelling on this specific lane of the selected link.

A probe data point may be understood to represent travel information (e.g. historic travel information) of a mobile device such as a vehicle, a navigation device and/or a smartphone. For example, a probe data point may represent a position captured by the mobile device and, optionally, further travel information (e.g. a speed) captured by the mobile device at this position. For example, the position may be a Global Navigation Satellite System (GNSS) position captured by a GNSS sensor of the mobile device.

For determining a lane specific speed profile for the selected link only probe data points may be used that represent a position that is on the selected link or matchable with the selected link as represented by the map data. A position may be understood to be matchable with the selected link, if it is matched with a position on the selected lane by a map matching algorithm. For example, a simple map matching algorithm would be projecting a probe point to the closest link. More sophisticated algorithms combine information on speed, direction of travel, and uncertainties in the input quantities.

For example, each probe data point of the plurality of probe data points represents a position that is on the selected link or matchable with the selected link as represented by the map data. The plurality of probe data points may comprise at least two probe data points, more specifically at least three probe data points. For example, the plurality of probe data points may comprise more than 100 probe data points.

As disclosed in more detail below, each perpendicular distance of the perpendicular distances may describe the shortest distance between the selected link (e.g. the center or a side of the specific link) as represented by the map data and a position represented by a probe data point of the plurality of probe data points. By statistical analysis, a strong dependence of the lane on which a mobile device traveled when it captured a position and the perpendicular distance can be shown. This dependency is used when determining the at least one lane specific speed profile at least partially based on the perpendicular distances between the selected link as represented by the map data and positions represented by a plurality of probe data points.

This may have the effect that lane specific speed profile may be determined even if no lane specific map data exist.

Determining the at least one lane specific speed profile at least partially based on the perpendicular distances may be understood to mean that the at least one lane specific speed profile is determined at least partially as a function of the perpendicular distances. For example, determining the at least one lane specific speed profile at least partially based on the perpendicular distances may mean that the perpendicular distances are determined and/or used for determining the at least one lane specific speed profile. Alternatively or additionally, it may mean that a function and/or a relationship which at least partially depends on the perpendicular distances is determined, modeled and/or used for determining the at least one lane specific speed profile.

The presented method may be for determining lane specific speed information, for example for determining lane specific speed information for a vehicle (e.g. a vehicle travelling on the specific lance of the selected link).

According to a further exemplary aspect of the invention, an apparatus is presented, which comprises means for performing, at least in part, the steps of any one embodiment of the presented method.

The means of the presented apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The presented apparatus may comprise a single means for all functions, a common plurality of means for all functions, or a plurality of different means for different functions.

According to a further exemplary aspect of the invention, another apparatus is presented, which comprises at least one processor and at least one memory including computer program code, the at least one memory and the computer program code with the at least one processor configured to cause the apparatus at least to perform, at least in part, the steps of any one embodiment of the presented method.

The presented apparatuses may be modules or components for a device, for example chips. Alternatively, the presented apparatuses may be devices. The presented apparatuses may comprise only the disclosed components (e.g. means) or may further comprise one or more additional components.

The presented apparatuses may be for determining lane specific speed information, for example for determining lane specific speed information for a vehicle (e.g. a vehicle travelling on the specific lance of the selected link).

The presented apparatuses may be or may be part of one of a server, a stationary device, a module for a device, a vehicle or an embedded navigation device of a vehicle.

According to a further exemplary aspect of the invention, a system is presented which comprises a plurality of apparatuses which are configured to perform, together, the steps of any one embodiment of the presented method. The apparatuses of the presented system may at least partially correspond to any one of the presented apparatuses according to an exemplary aspect of the invention. For example, the presented system may comprise a server or a server cloud for determining speed information for a vehicle and a vehicle.

According to a further exemplary aspect of the invention, a non-transitory computer readable storage medium is presented, in which computer program code is stored. The non-transitory computer readable storage medium may be tangible. The computer program code causes at least one apparatus to perform the steps of any one embodiment of the presented method when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is presented, the computer program code when executed by a processor causing an apparatus to perform the steps of any one embodiment of the presented method.

In the following, further features and embodiments of these exemplary aspects of the invention will be described.

According to an exemplary embodiment of the invention, the travel network is a road network. Accordingly, a link of the travel network represented by the map data may be understood to correspond to a road section of the road network, for example a road section between two junctions of the road network; and a lane of a link of the travel network represented by the map data may be understood to corresponds to a road lane of a road section of the road network.

According to an exemplary embodiment of the invention, the presented method further comprises obtaining or holding available the plurality of probe data points.

Holding available the plurality of probe data points may be understood to mean that the plurality of probe data points is stored in memory means of an apparatus performing the method. Alternatively or additionally, the plurality of probe data points could be obtained by receiving the plurality of probe data points, for example by communication means of an apparatus performing the presented method.

According to an exemplary embodiment of the invention, the plurality of probe data points are part of one or more probe data sets of a plurality of probe data sets.

A probe data set may comprise one or more probe data points.

For example, each probe data set of the plurality of probe data sets may comprise a sequence of probe data points captured by a mobile device (e.g. a vehicle, a navigation device and/or a smartphone). This may have the effect that a specific probe data set of the plurality of probe data sets and the probe data points of this specific probe data set of the plurality of probe data sets may be associated with a travel route of a specific mobile device. For example, the probe data points of the specific probe data set may represent positions and speeds captured by the specific mobile device when travelling along this travel route.

For example, each probe data point of a specific probe data set may comprise the identifier of the probe data set. The identifier may be indicative for a session of a service provider collecting probe data sets of a mobile device, a mobile device, or a combination thereof.

Each of these probe data sets may thus be considered to represent historic travel experiences of human drivers travelling along this travel route. A considerable amount of such probe data sets has been collected by service providers over time and this plurality of (historic) probe data sets can be used for determining lane specific speed profiles. For example, the plurality of probe data sets may comprise at least two probe data sets, more specifically at least three probe data sets. For example, the plurality of probe data sets may comprise more than 1000 probe data sets. To avoid a falsification of the speed profiles due to traffic congestions, only probe data sets collected during weekends and during night, from 8 pm to 7 am, during business days may be used for determining lane specific speed profiles in certain exemplary embodiments of the invention.

For determining a lane specific speed profile for the selected link only probe data sets may be used that are associated with the selected link. A probe data set may be understood to be associated with the selected link if the probe data set comprises at least one probe data point representing a position that is on the selected link or matchable with the selected link as represented by the map data.

This may have the effect that a speed profile for the selected link is determined based on one or more probe data points representing one or more speeds and positions of specific mobile devices which were travelling along a travel route including the selected link.

According to an exemplary embodiment of the invention, each probe data point of the plurality of probe data points represents a position and a speed, for example a position of a mobile device and a speed of this mobile device at this position.

As disclosed above, examples of such a mobile device may be a vehicle, a navigation device and/or a smartphone.

As further disclosed above, the position may be a position captured by the mobile device. For example, the position may be a Global Navigation Satellite System (GNSS) position captured by a GNSS sensor of the mobile device. For example, in determining a lane specific speed profile for the selected link only probe data points may be used that represent a position that is on the selected link or matchable with the selected link as represented by the map data.

The speed may be a speed captured by the mobile device. Alternatively or additionally, the speed may be determined at least partially based on one or more positions captured by the mobile device, for example by calculating the speed based on the distance between two positions (e.g. subsequently) captured by the mobile device and the time difference between capturing these two positions.

According to an exemplary embodiment of the invention, the lane specific speed profile for the selected link represents one speed (e.g. one speed value) for the specific lane of the selected link or a plurality of speeds (e.g. a plurality of speed values) for a plurality of subsequent segments of the specific lane of the selected link.

Each of the plurality of speeds may be a speed for a respective segment of the plurality of subsequent segments of the specific lane of selected link. For example, the selected link may be divided into the plurality of subsequent segments. This may enable a high spatial granularity of the lane specific speed profile. Each of the segments may have the same length (e.g. 10 m). Alternatively the segments may have at least partially different length.

As disclosed above, for determining a lane specific speed profile for the selected link only probe data points may be used that represent a position that is on the selected link or matchable with the selected link as represented by the map data. This may be particularly advantageous, if the lane specific speed profile for the selected link represents one speed for the specific lane of the selected link.

However, if the lane specific speed profile for the selected link represents a plurality of speeds for a plurality of subsequent segments of the specific lane of the selected link, it may be useful to further divide the probe data points based on the subsequent segments. In this case, for each segment of the plurality of segments only probe data points may be used for determining a lane specific speed profile for the selected link that represent a position that is on the respective segment of the plurality of subsequent segments or matchable with the respective segment of the plurality of subsequent segments as represented by the map data.

According to an exemplary embodiment of the invention, each perpendicular distance of the perpendicular distances represents the shortest distance between a position represented by a respective probe data point of the plurality of probe data points and the selected link of the travel network as represented by the map data.

The selected link may be represented by the map data as a line segment, for example as a line segment at the center or a side of the selected link. Accordingly, each perpendicular distance of the perpendicular distances may represent the shortest distance between a position represented by a respective probe data point of the plurality of probe data points and the line segment represented by the map data.

For example, the lane specific speed profile is at least partially determined by determining a linear regression for modeling a relationship between the speeds represented by the plurality of probe data points and the perpendicular distances and/or by determining a slope of the linear regression.

In certain exemplary embodiments of the invention, the lane specific speed profile may at least partially determined by determining a lane specific speed deviation at least partially based on the slope of the linear regression. For example, the lane specific speed deviation may be at least partially determined based on a total number of lanes of the selected link, a width of the specific lane of the selected link, a number of the specific lane or a combination thereof. For example, the speed deviation $\Delta V$ may be determined as follows:

$$\Delta v = S \cdot W \frac{N - 2L + 1}{2}.$$

In this example, S corresponds to the slope of the linear regression, W corresponds to the width of the specific lane, N corresponds to the total number of lanes of the selected link, and L corresponds to the number of the specific lane.

Preferably, the width of the lanes of the selected link may be equal. However, it is also possible that the width of the lanes of the selected link is at least partially different.

As disclosed above, the lanes of the selected link may be numbered. For example, the lanes of the selected link may be numbered from the left to the right in ascending order and by an increment of 1 if the selected link is a directional link. The number of the specific lane and the difference between the number of the specific lane and the total number of lanes of the selected link may thus be indicative for the position of the specific lane on the selected link.

In case the lane specific speed profile represents a plurality of speeds for a plurality of subsequent segments of the selected link, for each segment of the subsequent segments, a linear regression and/or a lane specific speed deviation may be determined based on probe data points representing a position on the respective segment.

According to an exemplary embodiment of the invention, the lane specific speed profile is at least partially determined by determining at least one of a mean speed, a median speed and a speed percentile at least partially based on the speeds represented by the plurality of probe data points.

Alternatively or additionally, the at least one of a mean speed, a median speed and a speed percentile may be determined in advance and, for example, corresponding speed information may be stored in memory means of an apparatus performing the method. In this case, the lane specific speed profile may be at least partially determined by using or obtaining at least one of a mean speed, a median speed and a speed percentile that were determined at least partially based on the speeds represented by the plurality of probe data points.

Examples of determined speed percentiles are a 10% speed percentile, a 25% speed percentile, a 30% speed percentile, a 50% speed percentile (i.e. the median speed), a 70% speed percentile, a 75% speed percentile, a 90% speed percentile or combinations thereof.

In case the lane specific speed profile represents a plurality of speeds for a plurality of subsequent segments of the selected link, for each segment of the subsequent segments, a mean speed or a speed percentile may be determined based on probe data points representing a position on the respective segment.

For example, different speed percentiles may be used for lane specific speed profiles for vehicles transporting human passengers (which have to account for the passenger comfort) and for vehicles transporting only goods or traveling empty to pick up passengers. In the latter case, without the constraints related to the human comfort, it is conceivable that autonomous vehicles would drive much faster than the ones driven by humans, while still maintaining the highest safety standards. For speed profiles for vehicles transporting human passengers for example the 50% speed percentile (i.e. the median speed) or the 70% speed percentile may be used; and for speed profiles for vehicles transporting only goods or traveling empty to pick up passengers for example the 75% speed percentile or the 90% speed percentile may be used.

According to an exemplary embodiment of the invention, the lane specific speed profile is determined by determining a sum of the lane specific speed deviation and the at least one of a mean speed, a median speed and a speed percentile.

In case the lane specific speed profile represents a plurality of speeds for a plurality of subsequent segments of the selected link, for each segment of the subsequent segments, a sum of a lane specific speed deviation and the at least one of a mean speed, a median speed and a speed percentile determined for the respective segment may be determined.

According to an exemplary embodiment of the invention, the presented method further comprises
providing or generating speed map data representing an association of the map data and a plurality of lane specific speed profiles for links of the travel network, the plurality of lane specific speed profiles comprising the at least one lane specific speed profile determined for the specific lane of the selected link.

According to an exemplary embodiment of the invention, the presented method further comprises:
determining speed information for at least one vehicle;
providing the speed information to the at least one vehicle.

For example, the at least one vehicle may request speed information for a travel route from an apparatus performing the presented method (e.g. a server, e.g. a server of the presented system). The request may specify the links (e.g. by link identifiers) and lanes on the links (e.g. by lane numbers) included in the travel route.

The travel route may have been determined by the vehicle based on map data obtained or hold available by the at least one vehicle. Alternatively or additionally, the travel route may have been determined by a server (e.g. a server of the presented system) for the vehicle. Determining the travel route information may be at least partially based on a starting position and a destination position. For example, the starting position may represent the current position of the vehicle and the destination position may represent a position of a desired destination of a user of the vehicle. The starting position and the destination position may be obtained by the at least one vehicle, for example by capturing the current position of the vehicle by a GNSS sensor and/or by receiving a user input on a user interface of the vehicle.

The speed information for the at least one vehicle may be determined to represent the lane specific speed profiles for the lanes on the links that are included in the travel route. For example, the speed information may represent the lane specific speed profile determined for the specific lane of the selected link.

Providing the speed information to the at least one vehicle may be understood to mean that the speed information are communicated or caused to be communicated to the at least one vehicle by an apparatus performing the presented method (e.g. by a server, e.g. a server of the presented system), for example by a communication interface of the apparatus. Alternatively or additionally, the speed information may be provided for use by the at least one vehicle, for example, for, at least in part, autonomously driving along the travel route. The speed information may cause the at least one vehicle to at least partially control and/or adapt its speed accordingly when driving along the route represented by the travel route information.

For example, the at least one vehicle may be, at least in part, an autonomous vehicle, a highly-assisted-driving vehicle, a vehicle with predictive cruise control, or a combination thereof. In certain exemplary embodiments of the invention, the vehicle may determine the speed information. Alternatively or additionally, the speed information may be determined by a server and communicated by the server to the vehicle.

According to an exemplary embodiment of the invention, the presented method is performed for a plurality of links of the travel network as selected link. This is understood to mean that the steps of the presented method may be performed (e.g. repeated) for further links of the plurality of links of the travel network as selected link.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

The following description serves to deepen the understanding of the present invention and shall be understood to complement and be read together with the description of example embodiments of the invention as provided in the above SUMMARY section of this specification.

By way of example, considering an autonomous vehicle driving in free flow conditions, the autonomous vehicle equipped with high performance sensors and sufficient computing power continuously scans the environment and decides, in real time, the optimal driving speed, taking into consideration multiple road factors such as speed limit, slope, curvature, number of lanes or lane widths. As these factors change along the road, the vehicle may continuously adapt the speed to a value which is optimal from the points of view of both safety and, if humans are transported by the vehicle, driver/passenger comfort. While the vehicle may be able to perform such computations in real time and to adopt the optimal speed based on sensor data only, such computations may be aided by "prior" knowledge for example provided by travel route information representing the current travel route of the vehicle and speed information representing speed profiles for the current travel route of the vehicle. For example, the vehicle could be configured to adapt the vehicle speed by default according to the speed information, while the final decision regarding the speed would be taken based on the information collected by the real time sensors. Since the vehicle may be already in the most probable state according to the historical experience of other drivers encoded in the speed profile, the real time changes dictated by the sensor observations would be minimal and only needed when deviations from the historical norm are observed. Such deviations may be expected in many cases which include recurring traffic congestion associated with the normal business hours and non-recurring congestion due to adverse weather conditions or incidents. The difference between an autonomous vehicle driving with and without this prior knowledge may be thought as analogous to the difference between a human driving in a familiar or un-familiar area. The same as the human driver is required to focus harder to understand the surroundings and navigate in an un-familiar area, the same way, an autonomous vehicle is expected to require more sensor information and computational power when driving without any prior knowledge.

Autonomous vehicles and vehicles equipped with predictive control can thus benefit from having available speed profiles or speed map data which provides typical driving speeds on every link with high spatial granularity, in particular lane specific speed profiles or speed map data which provide typical driving speeds on every lane of every link. Such lane specific speed profiles can be used by predictive cruise control and autonomous vehicles to provide a human-like driving experience.

Figure 1A:
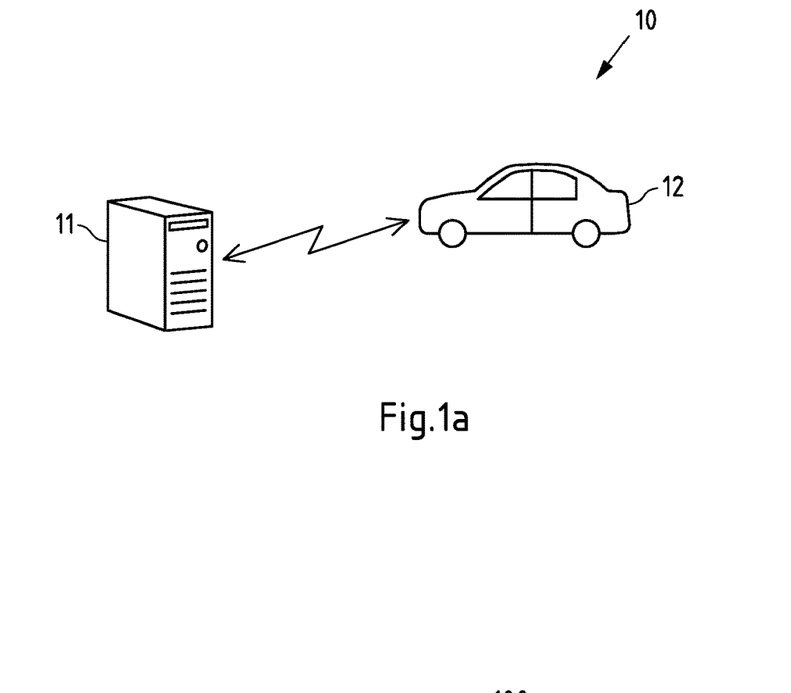
FIG. 1a is a block diagram of an exemplary embodiment of a system according to the invention.

FIG. 1a is a schematic high-level block diagram of a system 10 according to an exemplary aspect of the invention. System 10 comprises a server 11, which may alternatively be embodied as a server cloud (e.g. a plurality of servers connected e.g. via the internet and providing services at least partially jointly), and a vehicle 12.

According to exemplary embodiments of the present invention, server 11 may determine speed information for vehicle 12.

Vehicle 12 may be, at least in part, an autonomous vehicle, a highly-assisted-driving vehicle, a vehicle with predictive cruise control, or a combination thereof.

Communication between server 11 and vehicle 12 may for example take place at least partially in a wireless fashion, e.g. based on cellular radio communication or on Wireless Local Area Network (WLAN) based communication, to name but a few examples. In this way, mobility and connectivity of vehicle 12 is guaranteed.

Figure 1B:
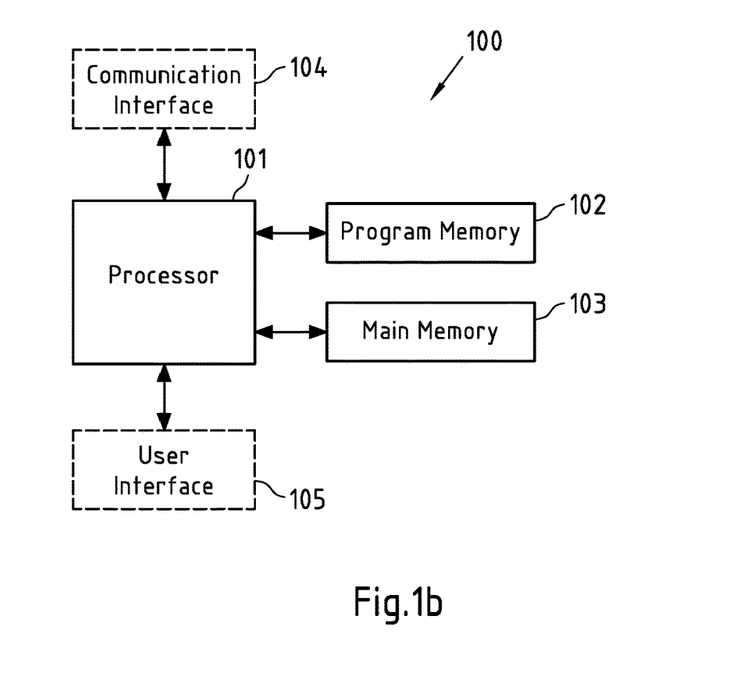
FIG. 1b is a block diagram of an exemplary embodiment of an apparatus according to the invention.

FIG. 1b is a block diagram of an apparatus 100 according to an exemplary aspect of the invention. Apparatus 100 may for example represent server 11 of system 10. Alternatively or additionally, apparatus 100 may for example represent an embedded navigational device of vehicle 12 of system 10.

Apparatus 100 comprises a processor 101. Processor 101 may represent a single processor or two or more processors, which are for instance at least partially coupled, for instance via a bus. Processor 101 executes a program code stored in program memory 102 (for instance program code causing apparatus 100 to perform one or more of the embodiments of a method (or parts thereof) according to the invention (as for instance further described below with reference to FIGS. 2a-b), when executed on processor 101), and interfaces with a main memory 103. Some or all of memories 102 and 103 may also be included into processor 101. One of or both of memories 102 and 103 may be fixedly connected to processor 101 or at least partially removable from processor 101, for instance in the form of a memory card or stick. Program memory 102 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 102 may also comprise an operating system for processor 101. Program memory 102 may for instance comprise a first memory portion that is fixedly installed in apparatus 100, and a second memory portion that is removable from apparatus 100, for instance in the form of a removable SD memory card.

Main memory 103 may for instance be a volatile memory. It may for instance be a DRAM memory, to give non-limiting example. It may for instance be used as a working memory for processor 101 when executing an operating system and/or programs.

Processor 101 further controls an optional communication interface 104 configured to communicate with other devices (e.g. with server 11 or vehicle 12), for example by receiving and/or sending data and/or information. The communication may for example be based on a wireless communication connection. The communication interface 104 may thus comprise circuitry such as modulators, filters, mixers, switches and/or one or more antennas to allow wireless transmission and/or reception of signals. In embodiments of the invention, communication interface 104 is inter alia configured to allow communication based on a cellular radio communication (e.g. a 2G/3G/4G/5G cellular radio communication) and/or a non-cellular radio communication (e.g. a WLAN or Bluetooth communication). The 2G/3G/4G/5G cellular radio communication standards are developed by the 3GPP and presently available under http://www.3gpp.org/. The Bluetooth standards are specified by the Bluetooth Special Interest Group and is presently available under https://www.bluetooth.com/. WLAN is for examply specified by the standards of the IEEE 802.11 family (cf. http://www.ieee.org/). Alternatively or additionally, the communication may equally well be based on a wirebound communication connection or a combination of wireless and wirebound communication connections. Accordingly, the communication interface 104 may thus comprise circuitry such as modulators, filters, mixers, switches to allow a wirebound transmission and/or reception of signals. In embodiments of the invention, communication interface 104 is inter alia configured to allow communication based on an Ethernet communication such as a LAN (Local Area Network) communication.

Processor 101 further controls an optional user interface 105 configured to present information to a user of apparatus 100 and/or to receive information from such a user. User interface 105 may for instance be the standard user interface via which a user of apparatus 100 controls other functionality thereof. Examples of such a user interface are a touch-sensitive display, a keyboard, a touchpad, a display, etc.

The components 102-105 of apparatus 100 may for instance be connected with processor 101 by means of one or more serial and/or parallel busses.

It is to be understood that apparatus 100 may comprise various other components (e.g. a positioning sensor such as a Global Navigation Satellite System (GNSS) sensor).

Figure 2A:
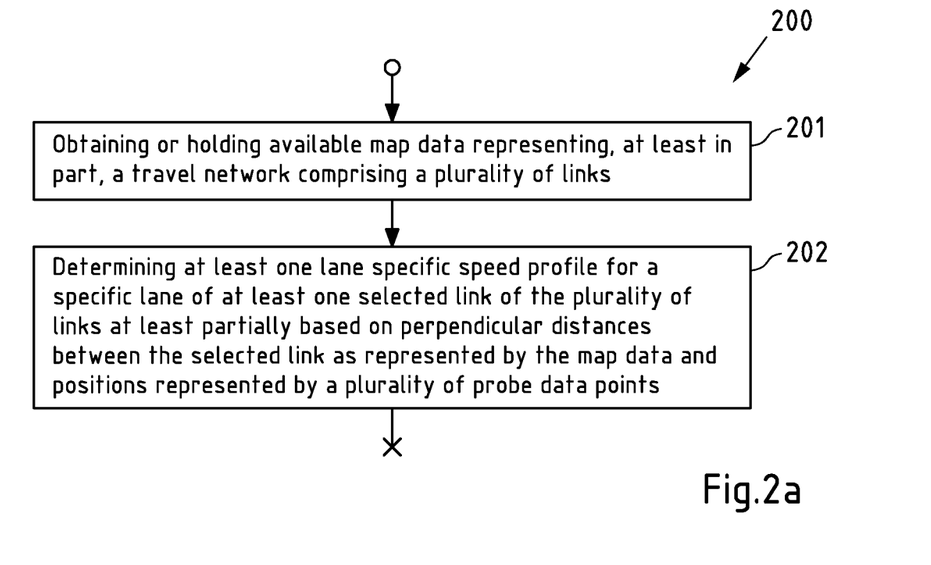
FIGS. 2a-b are flowcharts of exemplary embodiments methods according to the invention.

FIG. 2*a* is a flowchart 200 illustrating an exemplary embodiment of a method according to the invention. In the following, it is assumed that the steps of this flowchart 200 are performed by server 11 of system 10 of FIG. 1*a*.

In a step 201, server 11 obtains or holds available map data representing, at least in part, a travel network comprising a plurality of links. The map data may for example be received by communication interface 104 of server 11 and, subsequently, be stored in memory 102 of server 11. For example, the map data may be part of a navigation database stored in memory 102 of server 11.

Figure 3A:
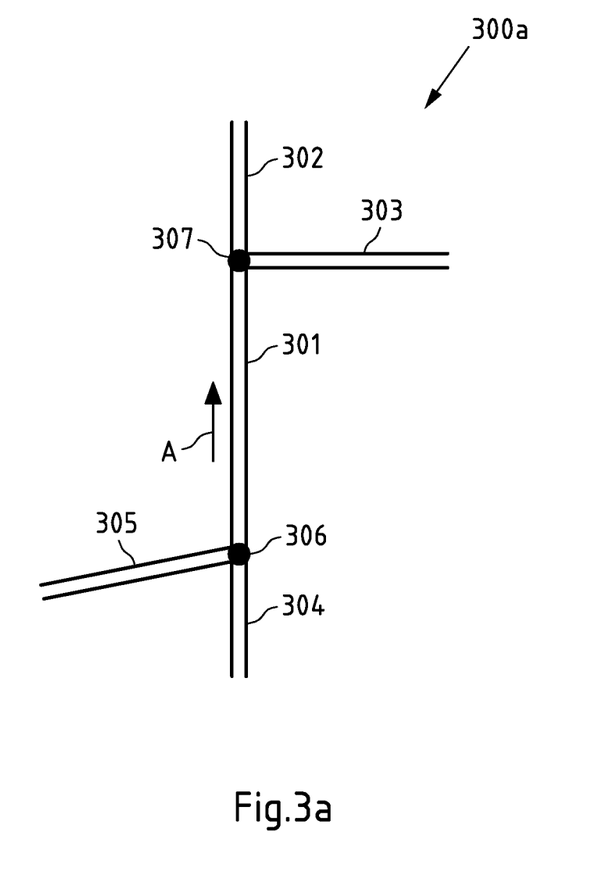
FIGS. 3a-c are illustrations of at least a part of an exemplary travel network represented by map data and exemplary probe data sets of specific mobile devices travelling in the travel network.

FIG. 3*a* illustrates at least in part an exemplary travel network 300*a* represented by such map data. Travel network 300*a* comprises links 301, 302, 303, 304 and 305 and junctions 306 and 307. A link of travel network 300*a* may for example be understood to represent a section of the travel network which is between two junctions like link 301 which is between junctions 306 and 307.

In the following, it is assumed that the reference signs of the links correspond to unique link identifiers associated with the links and a travel direction of the links may be indicated by the characters "T" or "F". Thus, link 301 may be identified by "301T" in the travel direction indicated by arrow A in FIG. 3*a* and by "301F" in the other travel direction.

Figure 3B:
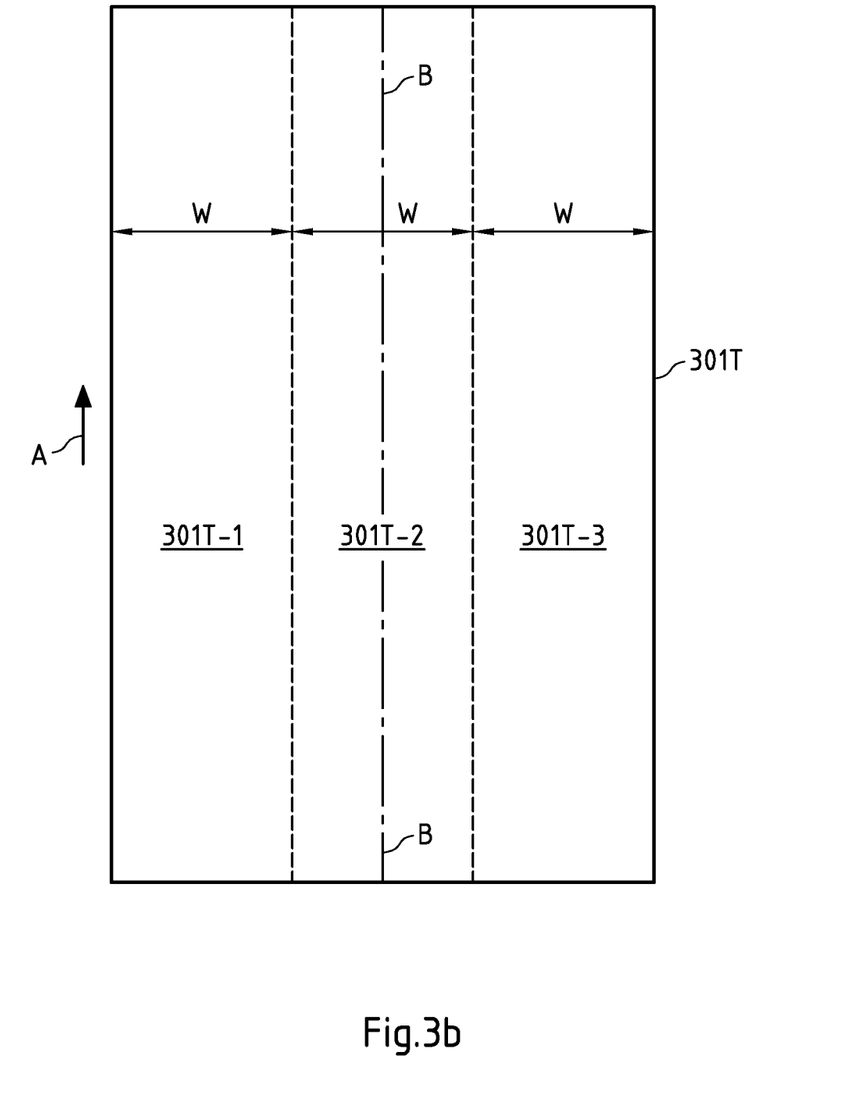

As shown in FIG. 3*b*, link 301T may comprise three lanes 301T-1, 301T-2 and 301T-3 which are numbered from the left to the right in ascending order. Thus, lane number 1 of link 301T corresponds to lane 301T-1, lane number 2 of link 301T corresponds to lane 301T-2 and lane number 3 of link 301T corresponds to lane 301T-3. The lane width W may be equal for each of the lanes 301T-1, 301T-2 and 301T-3.

In the following, it is assumed that the map data is not lane specific and only defines a line segment B as a representation of link 301T. Therein, line segment B represents the center of link 301T as shown in FIG. 3*b*.

In a step 202, server 11 determines at least one lane specific speed profile for a specific lane of at least one selected link of the plurality of links at least partially based on perpendicular distances between the selected link as represented by the map data and positions represented by a plurality of probe data points.

The plurality of probe data points may be stored in program memory 102 of server 11.

The probe data points may be part of one or more probe data sets of a plurality of probe data sets. Therein, each probe data set of the plurality of probe data sets may comprise a sequence of probe data points representing a position and a speed of a mobile device. Each probe data point of a specific probe data set may comprise the identifier of the probe data set. The identifier may be indicative for a session of a service provider collecting probe data sets of a mobile device, a mobile device, or a combination thereof. Examples of such a mobile device may be a vehicle (e.g. vehicle 12), a navigation device and/or a smartphone.

The positions represented by the sequence of probe data points of a respective probe data set of the plurality of probe data sets may be GNSS positions captured by a GNSS sensor of a specific mobile device when travelling along a travel route. A considerable amount of such probe data sets has been collected by service providers over time and this plurality of (historic) probe data sets can be used for determining lane specific speed profiles for links of a travel network. To avoid a falsification of the lane specific speed profiles due to traffic congestions, only probe data sets collected during weekends and during night, from 8 pm to 7 am, during business days may be used for determining lane specific speed profiles.

For determining a lane specific speed profile for the selected link only probe data sets may be used that are associated with the selected link. For example, the plurality of probe data points may comprise the probe data points of the probe data sets that are determined to be associated with the selected link. Furthermore, the plurality of probe data points may only comprise probe data points that are determined to represent a position that is on the selected link or matchable with the selected link.

A probe data set may be understood to be associated with the selected link if the probe data set comprises at least one probe data point representing a position that is on the selected link or matchable with the selected link as represented by the map data. The determining whether one or more probe data sets of a plurality of probe data sets are associated with at least one selected link of the travel network based on one or more positions represented by one or more probe data points of the one or more probe data sets may be performed in an optional step prior to step 202. As a result of such a determining, a list with identifiers of probe data sets that have been determined to be associated with the selected link may be obtained. Alternatively or additionally, the probe data sets associated with the selected link of the travel network may be determined in advance and, for example, corresponding association information (e.g. a list with identifiers of probe data sets that have been determined to be associated with the selected link) may be stored in program memory 102 of server 11.

For example, the determining whether a probe data point represent a position that is on the selected link or matchable with the selected link may be only performed for the probe data points of the probe data sets that are determined to be associated with the selected link. This determining whether a probe data point represent a position that is on the selected link or matchable with the selected link may be performed in step 202.

In the following it is assumed that link 301T is the selected link and the plurality of probe data points represent positions that are matchable with selected link 301T (e.g. matchable by a map matching algorithm).

Figure 3C:
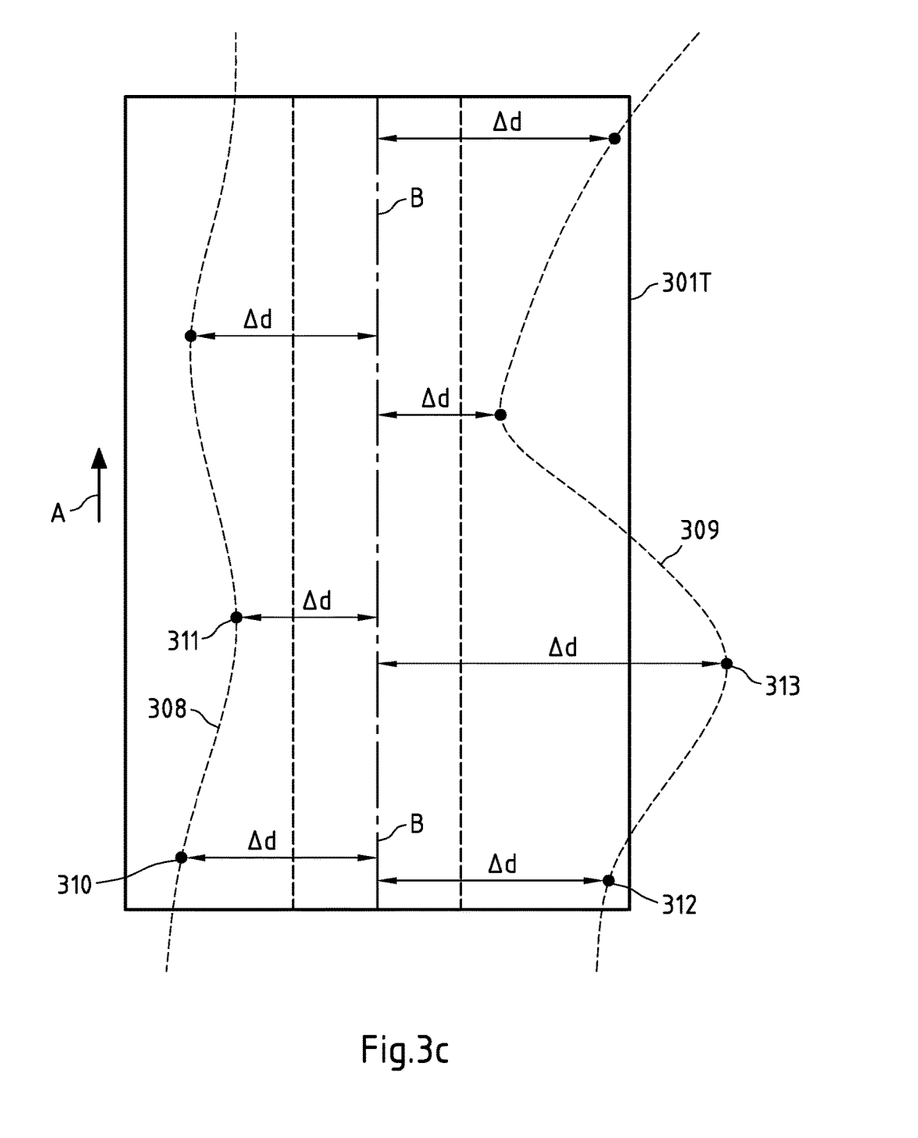

FIG. 3c illustrates exemplary probe data sets 308 and 309 of specific mobile devices travelling in the travel network 300a of FIGS. 3a-c.

The positions represented by the sequence of probe data points of probe data sets 308 and 309 are indicated by points in FIG. 3c. For example, probe data set 308 comprises a sequence of probe data points including probe data points representing positions 310 and 311; and probe data set 309 comprises a sequence of probe data points including probe data points representing positions 312 and 313.

Probe data set 308 may have been generated by a mobile device (e.g. a vehicle) travelling on lane 301T-1 of selected link 301T, and probe data set 309 may have been generated by a mobile device (e.g. a vehicle) travelling on lane 301T-3 of selected link 301T. In the following, it is assumed that the positions represented by the sequence of probe data points of probe data sets 308 and 309 shown in FIG. 3c are matchable (i.e. can be matched) with link 301T which is represented by the map data as line segment B by a map matching algorithm.

Since both probe data sets 308 and 309 comprise probe data points representing one or more positions that are matchable with link 301T, they may be determined to be associated with selected link 301T. The list with identifiers of probe data sets that have been determined to be associated with the selected link 301T may be thus as follows: {308, 309, . . . }.

A lane specific speed profile for the selected link 301T may represent speed information (e.g. one or more speeds) for a specific lane of lanes 301T-1, 301T-2 and 301T-3 of selected link 301T. In the following it is assumed that a lane specific speed profile for the selected link 301T represents one speed for the selected link 301T.

Since the map data is not lane specific and only defines a line segment B which is arranged at the center of link 301T as a representation of link 301T, it is not possible to directly create a lane specific speed profile for a specific lane of the selected link 301T. However, statistical analysis shows strong speed dependence on perpendicular distance from the center of the link. This dependency is exemplary shown by the plot 400 of FIG. 4 and can be used for determining a lane specific speed profile.

Figure 4:
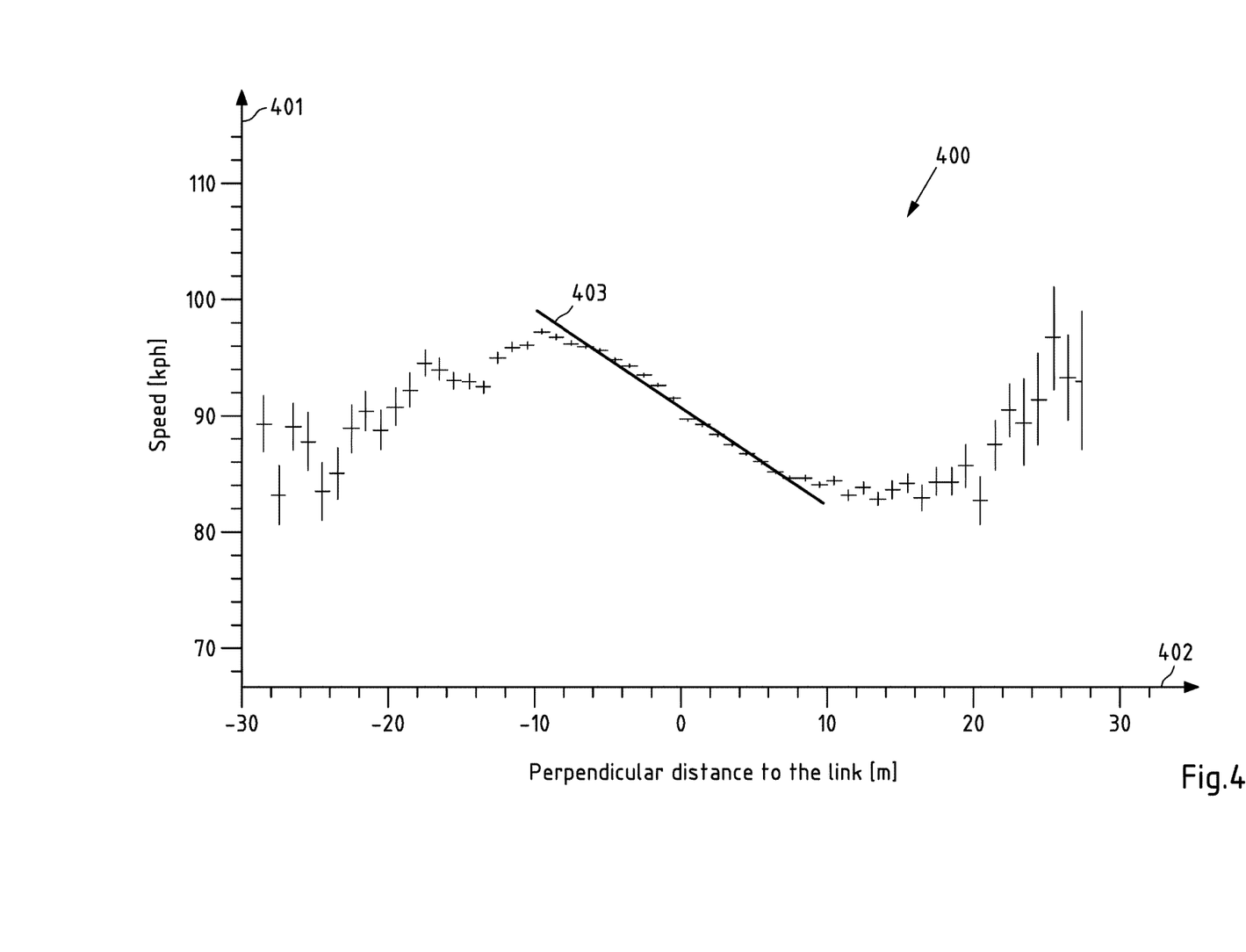
FIG. 4 is an exemplary plot showing a relationship between speeds and perpendicular distances.

In FIG. 4, the Y-axis 401 corresponds to speeds represented by the plurality of probe data points (e.g. representing a position that is matchable with a selected link, e.g. link 301T). The X-axis 402 corresponds to the perpendicular distance between the selected link (e.g. link 301T) as represented by the map data and positions represented by the plurality of probe data points. In FIG. 4, each point represents a relationship between an average speed represented by vehicles on that link from all lanes. The regression line shows the tendency of speed away from the center of the road. The vertical line on each point represent the error of mean and horizontal line on the point the width of a bin on the x-axis. The vertical errors get increased beyond ±10 meters which illustrates the approximate road width might be 20 meters. The reason there are still points beyond 10 meters is due to GPS position errors.

As disclosed above, a perpendicular distance may be understood to represent the shortest distance between a position represented by a respective probe data point and the selected link of the travel network as represented by the map data. In FIG. 3c exemplary perpendicular distances $\Delta d$ between line segment B (i.e. link 301T as represented by the map data) and positions represented by the probe data points of probe data sets 308 and 309 are shown as shortest distances. For probe data points representing a position on the left side of line segment B (e.g. probe data point 310), the perpendicular distance $\Delta d$ is negative; and for probe data points representing a position on the right side of line segment B (e.g. probe data point 312), the perpendicular distance $\Delta d$ is positive.

In FIG. 4, error bars are used to indicate the uncertainty of the speeds and positions represented by the probe data points. These uncertainties may be for example due to position capturing inaccuracies and poor position resolution. For example, the positions represented by the probe data points may be beside the link (cf. position represented by probe data point 313 in FIG. 3c). Accordingly, the perpendicular distances may not reflect the real link width.

As apparent from FIG. 4, probe data points representing a position on the left side of the selected link (e.g. link 301T) significantly represent higher speeds than probe data points representing a position on the right side of the selected link (e.g. link 301T). From this observation, it may be concluded that the historic speed of vehicles travelling on the leftmost lane of the selected link was typically higher than the speed of vehicles travelling on the rightmost lane of the selected link. Despite the above described uncertainties, the relationship between the speeds and perpendicular distances of the plurality of probe data points can thus be used for determining a lane specific speed profile for a specific lane of the selected link (e.g. link 301T) in step 202. For example, this relationship can be modeled by linear regression 403 as shown in FIG. 4.

Accordingly, the lane specific speed profile may be at least partially determined by determining a linear regression for modeling a relationship between the speeds represented by the plurality of probe data points and the perpendicular distances and/or by determining a slope of the linear regression in step 202.

In step 202, the lane specific speed profile may be determined by determining a lane specific speed deviation and at least one of a mean speed, a speed percentile and a median speed based on the plurality of probe data points. Alternatively or additionally, the at least one of a mean speed, a median speed and a speed percentile may be determined in advance and, for example, corresponding speed information may be stored in program memory 102 of server 11 (e.g. as part of the map data).

The speed represented by the lane specific speed profile for the specific lane of the selected link (e.g. link 301T) may then be determined by determining the sum of the lane specific speed deviation and the at least one of a mean speed, a median speed and a speed percentile as follows:

$$v = v_m + \Delta v.$$

Therein, v corresponds to the speed that is to be represented by the lane specific speed profile for the specific lane of the selected link, $v_m$ corresponds to the at least one of a mean speed, a median speed and a speed percentile, and $\Delta v$ corresponds to the lane specific speed deviation.

The lane specific speed deviation $\Delta v$ may be determined as follows:

$$\Delta v = S \cdot W \frac{N - 2L + 1}{2}.$$

Therein, S corresponds to the slope of the linear regression (e.g. linear regression 403) modeling a relationship between the speeds represented by the plurality of probe data points and the perpendicular distances, W corresponds to the width of the specific lane, N corresponds to the total number of lanes of the selected link, and L corresponds to the number of the specific link. In case the lane specific speed profile is for lane 301T-1 of selected link 301T, N would be 1 (i.e. the number of lane 301T-1) and L would be 3 (i.e. the total number of lanes of selected link 301T).

The steps 201 to 202 may be repeated for each lane of each link of the travel network represented by the map data. Subsequently, a speed map data may be generated representing an association of the map data and a plurality of lane specific speed profiles for the links of the travel network.

Figure 2B:
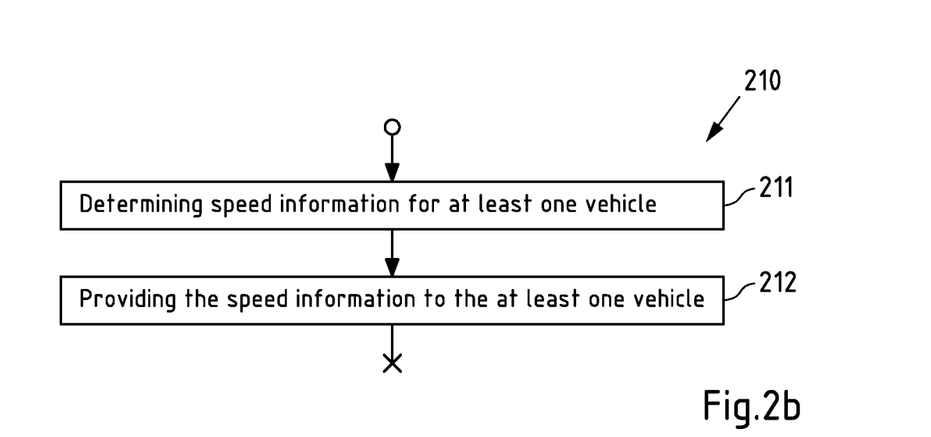

FIG. 2b is a flowchart 210 illustrating optional steps of the method according to the invention. The steps of flowchart 210 may for example be performed subsequent to the steps of flowchart 200 of FIG. 2a. In the following, it is assumed that the steps of this flowchart 210 are performed by server 11 of system 10 of FIG. 1a. Alternatively or additionally, the steps of this flowchart may be at least partially performed by vehicle 12 of system 10 of FIG. 1a.

In step 211, server 11 determines speed information for vehicle 12. For example, the speed information may at least partially represent the at least one lane specific speed profile for a specific lane of the at least one selected link determined in step 202 of flowchart 200 of FIG. 2a.

For example, server 11 may receive a request for determining speed information for a travel route from vehicle 12. The request may specify the links and for each link one or more lanes included in the travel route.

The speed information for vehicle 12 may be determined to represent the lane specific speed profiles for the links and lanes of the links that are included in the travel route.

By way of example, the speed information may represent lane specific speed profiles at which despite the automotive capabilities of vehicle 12 in terms of speed, acceleration, braking, etc., a user may still feel comfortable and safe within the vehicle while traveling and/or the vehicle may interact safely with one or more other vehicles on the same route.

In step 212, server 11 may provide the speed information to vehicle 12. For example the speed information may be communicated from server 11 to vehicle 12.

Vehicle 12 may use the speed information for, at least in part, autonomously driving along the travel route. The speed information may cause vehicle 12 to at least partially control and/or adapt its speed accordingly when driving along the route represented by the travel route information.

Figure 5:
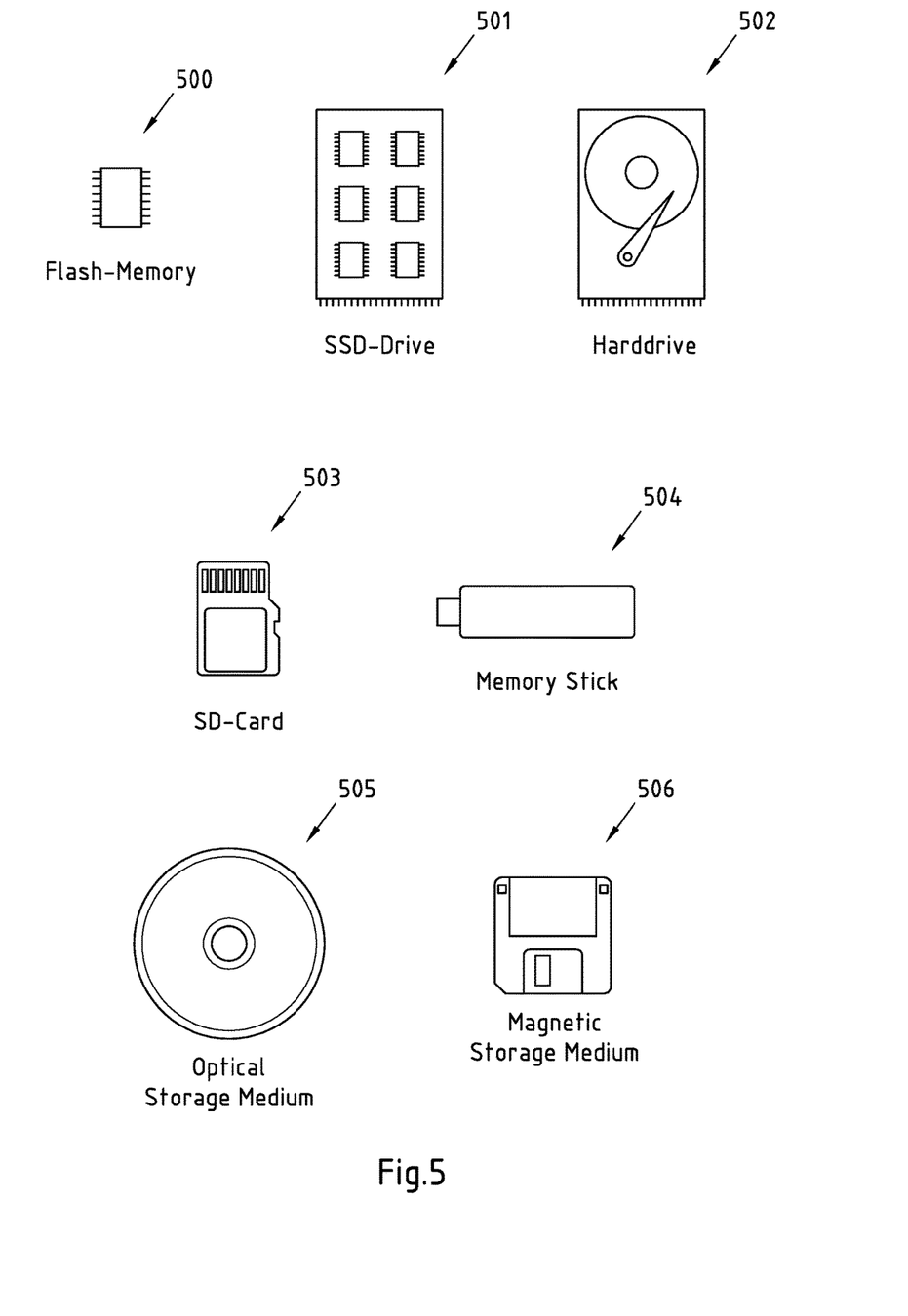
FIG. 5 is a schematic illustration of examples of tangible and non-transitory storage media according to the present invention.

FIG. 5 is a schematic illustration of examples of tangible and non-transitory computer-readable storage media according to the present invention that may for instance be used to implement program memory 102 of FIG. 1. To this end, FIG. 5 displays a flash memory 500, which may for instance be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for instance a CD-ROM or DVD) and a magnetic storage medium 506.

In the present specification, any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following: (a) hardware-only circuit implementations (such as implementations in only analog and/or digital circuitry) (b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processor 101 of FIG. 1b, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the methods, processes, steps and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method, said method comprising:
   obtaining or holding available map data representing, at least in part, a travel network comprising a plurality of links,
   determining at least one lane specific speed profile for a specific lane of at least one selected link of said plurality of links at least partially based on:
      perpendicular distances between said selected link as represented by said map data and positions represented by a plurality of probe data points, and
      a linear regression for modeling a relationship between said speeds represented by said plurality of probe data points and said perpendicular distances or a slope of said linear regression or by a combination thereof;
   wherein said selected link is represented by said map data as a line segment, wherein each probe data point of said plurality of data points represents a position associated with said selected link; and
   providing for generation of speed map data representing an association of the map data and the at least one lane specific speed profile for a specific lane of the at least one selected link of said plurality of links.

2. The method according to claim 1, said method further comprising:
   obtaining or holding available said plurality of probe data points, wherein said plurality of probe data points are of one or more probe data sets of a plurality of probe data sets, wherein said one or more probe data sets are associated with said selected link.

3. The method according to claim 1, wherein said lane specific speed profile is at least partially determined by determining a lane specific speed deviation at least partially based on said slope of said linear regression.

4. The method according to claim 3, wherein said lane specific speed profile is at least partially determined by determining at least one of a mean speed, a median speed and a speed percentile at least partially based on said speeds represented by said plurality of probe data points.

5. The method according to claim 4, wherein said lane specific speed profile is at least partially determined by determining a sum of said lane specific speed deviation and said at least one of a mean speed, a median speed and a speed percentile.

6. An apparatus comprising at least one processor and at least one memory including computer program code for one or more programs, said at least one memory and said computer program code configured to, with said at least one processor, cause said apparatus to:
   obtain or hold available map data representing, at least in part, a travel network comprising a plurality of links,
   determine at least one lane specific speed profile for a specific lane of at least one selected link of said plurality of links at least partially based on:
      perpendicular distances between said selected link as represented by said map data and positions represented by a plurality of probe data points; and
      a linear regression for modeling a relationship between said speeds represented by said plurality of probe data points and said perpendicular distances or a slope of said linear regression or by a combination thereof;
   wherein each said probe data points of said plurality of data points represents a position and a speed, and wherein each probe data point of said plurality of probe data points represents a position associated with said selected link; and
   provide for generation of speed map data representing an association of the map data and the at least one lane specific speed profile for a specific lane of the at least one selected link of said plurality of links.

7. The apparatus according to claim 6, wherein said at least one memory and said computer program code are configured to, with said at least one processor, further cause the apparatus to:
   obtain or hold available said plurality of probe data points, wherein said plurality of probe data points are of one or more probe data sets of a plurality of probe data sets, wherein said one or more probe data sets are associated with said selected link.

8. The apparatus according to claim 6, wherein said lane specific speed profile for said selected link represents one speed for said specific lane of said selected link or a plurality of speeds for said specific lane of said selected link for a plurality of subsequent segments of said selected link.

9. The apparatus according to claim 6, wherein each perpendicular distance of said perpendicular distances represents the shortest distance between a position represented by a respective probe data point of said plurality of probe data points and said selected link of said travel network as represented by said map data.

10. The apparatus according to claim 6, wherein said selected link is represented by said map data as a line segment.

11. The apparatus according to claim 6, wherein said lane specific speed profile is at least partially determined by determining a lane specific speed deviation at least partially based on said slope of said linear regression.

12. The apparatus according to claim 11, wherein said lane specific speed profile is at least partially determined by determining at least one of a mean speed, a median speed and a speed percentile at least partially based on said speeds represented by said plurality of probe data points.

13. The apparatus according to claim 6, wherein said lane specific speed profile is at least partially determined by determining a sum of said lane specific speed deviation and said at least one of a mean speed, a median speed and a speed percentile.

14. The apparatus according to claim 6, wherein said lane specific speed profile is at least partially determined based on one or more of: a total number of lanes of said selected link, a width of a lane of said selected link, or a number of said specific lane.

15. The apparatus according to claim 6, wherein said at least one memory and said computer program code are configured to, with said at least one processor, further cause the apparatus to:

provide or generate speed map data representing an association of said map data and a plurality of lane specific speed profiles for links of said travel network, said plurality of lane specific speed profiles comprising said at least one lane specific speed profile determined for said specific lane of said selected link.

16. The apparatus according to claim 6, wherein said at least one memory and said computer program code are configured to, with said at least one processor, further cause the apparatus to:

determine speed information for at least one vehicle;
provide said speed information to said at least one vehicle.

17. The apparatus according to claim 6, wherein said apparatus is one of:

a server;
a stationary device;
a vehicle; or
an embedded navigation device of a vehicle.

18. A non-transitory computer readable storage medium including one or more sequences of one or more instructions which, when executed by one or more processors, cause an apparatus to:

obtain or hold available map data representing, at least in part, a travel network comprising a plurality of links, determine at least one lane specific speed profile for a specific lane of at least one selected link of said plurality of links at least partially based on:

perpendicular distances between said selected link as represented by said map data and positions represented by a plurality of probe data points; and a linear regression for modeling a relationship between said speeds represented by said plurality of probe data points and said perpendicular distances or a slope of said linear regression or by a combination thereof; and provide for generation of speed map data representing an association of the map data and the at least one lane specific speed profile for a specific lane of the at least one selected link of said plurality of links.

19. The method of claim 1, further comprising providing for at least partially autonomous control of a vehicle traveling along the specific lane of the at least one selected link according to the at least one lane specific speed profile.

20. The apparatus of claim 6, wherein the apparatus is further caused to:

provide for at least partially autonomous control of a vehicle traveling along the specific lane of the at least one selected link according to the at least one lane specific speed profile.

* * * * *